United States Patent [19]

Coveney

[11] 4,306,466

[45] Dec. 22, 1981

[54] WHEEL SECURITY APPARATUS

[76] Inventor: Howard W. Coveney, 1180 Falstaff Dr., Roswell, Ga. 30075

[21] Appl. No.: 72,141

[22] Filed: Sep. 4, 1979

[51] Int. Cl.³ .............................................. G05G 1/12
[52] U.S. Cl. ..................................... 74/548; 74/552; 403/259; 403/356; 403/365; 70/218
[58] Field of Search ................. 74/552, 554, 556, 548; 403/405, 406, 407, 298, 308, 256, 304, 293, 365, 356, 259; 64/9 R, 23.5; 70/218, 209, 223; 180/287

[56] References Cited

U.S. PATENT DOCUMENTS

| 577,897 | 3/1897 | Walker | 74/548 X |
|---|---|---|---|
| 1,211,585 | 1/1917 | Hooper | 74/548 |
| 1,535,271 | 4/1925 | Vanderlip | 70/223 |
| 2,550,775 | 5/1951 | Clark | 403/DIG. 1 |
| 2,659,217 | 11/1953 | Talbot | 64/9 R |
| 3,742,656 | 7/1973 | Amos | 403/365 X |
| 3,838,929 | 10/1974 | Burrell | 403/365 |
| 3,970,407 | 7/1976 | Uffman | 403/DIG. 1 |
| 4,006,993 | 2/1977 | Woerlee | 403/365 X |
| 4,075,870 | 2/1978 | Seifried | 64/9 R |
| 4,195,542 | 4/1980 | Zimmer | 403/DIG. 1 X |

FOREIGN PATENT DOCUMENTS

| 221060 | 9/1924 | United Kingdom | 74/552 |
| 1091765 | 11/1967 | United Kingdom | 74/552 |

Primary Examiner—Kenneth Dorner
Attorney, Agent, or Firm—Robert B. Kennedy

[57] ABSTRACT

Apparatus is disclosed for securing a wheel and shaft which comprises a collar rigidly mounted to the shaft having an annular peripheral surface formed with radially spaced recesses, and a ring having an annular inner surface formed with radially spaced projections keyed for removable placement within the collar recesses. The apparatus further comprises means for releasably coupling the ring with the wheel when positioned about the collar.

2 Claims, 4 Drawing Figures

WHEEL SECURITY APPARATUS

BACKGROUND OF THE INVENTION

This invention relates generally to apparatuses for securing or locking wheels, and particularly to apparatuses for securing the steering wheels of automotive vehicles.

Automobiles ordinarily are equipped with means for inhibiting their unauthorized use. Usually these means are in the forms of door locks and locks operatively associated with the engine starter that requires the use of a key to complete an ignition circuit. Though these devices do offer a substantial degree of security, they may be circumvented by determined thiefs as by the breaking of door windows and the short circuiting of the ignition circuit locks.

In an effort to provide an added measure of security, apparatuses have also heretofore been devised for securing the vehicle steering wheels. Exemplary of these are those devices disclosed in U.S. Pat. Nos. 1,065,103, 1,112,782, 1,146,345, 1,437,480, 1,484,639, 1,548,636, 1,549,460, 1,552,586 and 1,642,325. These devices have typically provided means for either inhibiting rotary movement of the steering wheel or in preventing movements of the steering wheels from rotating their associated steering shafts. This is commonly accomplished with devices that control the meshing of gears mounted to the wheel and shaft or by requiring the attachment of a coupling mechanism in order to operatively associate the wheel with the shaft. These devices however have not found wide acceptance due to their complexity of design and operation. The present invention is therefore directed to the provision of an apparatus for securing wheels which is of relatively simple and economic construction, which may be readily provided on existing wheels, and which can be used in a reliable and simplistic manner.

SUMMARY OF THE INVENTION

In one preferred form of the invention apparatus is provided for securing a wheel and shaft comprising a collar adapted to be rigidly mounted to the shaft having a generally annular peripheral surface formed with a plurality of radially spaced recesses and a ring having a generally annular inner surface formed with a plurality of radially spaced projections keyed for removable placement within the collar recesses. The apparatus further comprises means for releasibly coupling the ring with the wheel when positioned about said collar whereby the wheel may be rendered operatively secured to the shaft by placement of the ring about the collar and the wheel rendered inoperatively detached from the shaft by removal of the ring from about the collar.

DESCRIPTION OF THE PREFERRED EMBODIMENTS

Figure 3:
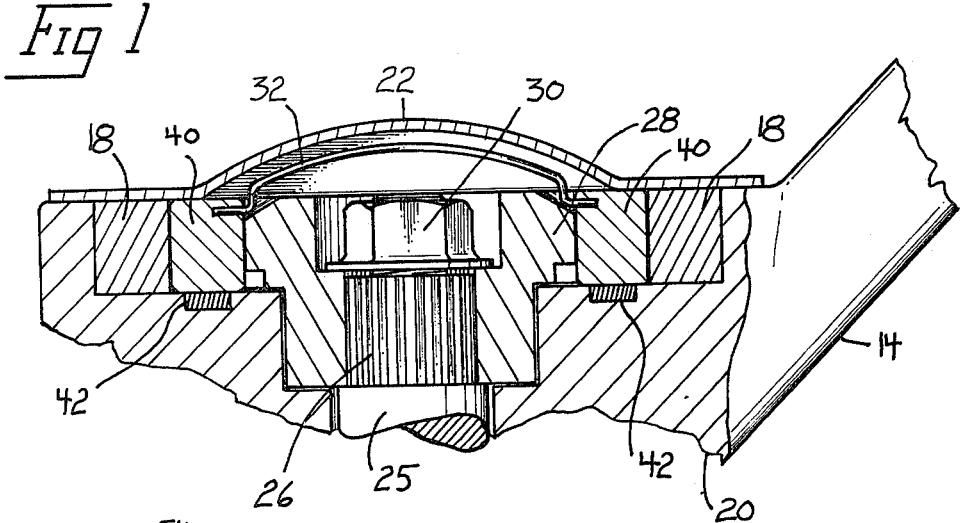
FIG. 3 is a side elevational view in cross-section of a portion of the steering wheel shown in FIG. 1.

Referring now in more detail to the drawing, there is shown a steering wheel having a hub 12 from which three spokes 14 radiate to a ring 15. A horn actuation button 16 is mounted to each of the wheel spokes. The hub includes a ring 18 rigidly secured to a hub base 20, and a bulbous cap 22 that is pivotably mounted by unshown hinge means atop the hub for manual movement between the position shown in FIG. 1 and a closed position as shown in FIG. 3.

The wheel is also seen to include a rotatable steering shaft 25 having a splined section 26 about which a shaft collar 28 is press fitted. An annular void is defined between the collar 28 and hub base 20 in order to insert a puller should collar removal ever be needed. A nut 30 is threaded upon the upper end of the shaft 25 against a shoulder of collar 28. An arcuate bail or handle 32 is mounted to the collar for manual movement between its normally lowered position shown in FIG. 3 beneath cap 22 to a momentarily raised position as shown in FIG. 2.

Figure 2:
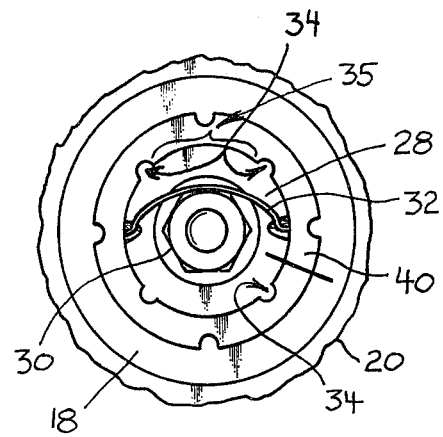
FIG. 2 is a front view in more detail of the security apparatus shown in FIG. 1.

The generally annular, peripheral surface of the collar 28 is seen in FIG. 2 to be formed of radially spaced projections 34 that are joined by recess portions 35. Similarly, the inner, annular surface of the hub ring 18 is also formed of alternating projections and recesses.

Between the hub ring 18 and the shaft collar 28 is located another removable ring or annular coupler 40. Both the outer and inner, generally annular surfaces of this removable ring are formed of alternating projections and recesses that are respectively keyed to the projections and recesses of the ring 18 and collar 28. With this construction the removable ring may be snuggly placed between shaft collar 28 and hub ring 18 thereby mechanically coupling the shaft collar and hub ring together. The removable ring is held seated in such a position by an annular magnet 42 and cap 22. Alternatively, the coupler 40 itself may be magnetized.

Figure 1:
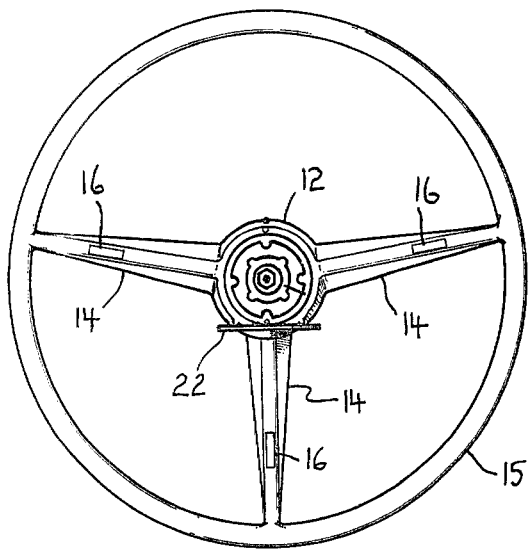
FIG. 1 is a front view of an automobile steering wheel having a security apparatus embodying principles of the invention mounted thereto.

For rendering the steering wheel operatively coupled with shaft 25 the ring 40 is positioned as shown in FIGS. 1-3. between the shaft collar 28 and hub ring 18. When it is desired to secure the wheel the ring 40 is removed by opening cap 22. and manually pulling the ring away from magent 42 and off of the wheel hub by gripping bail 32 and then closing the cap. With the ring removed rotary movement of the wheel does not cause a roatation of the shaft 25. In other words, the steering wheel is rendered free wheeling and inoperative as a steering device.

To make the steering wheel operative again the cap 22 is momentarily opened and the ring 40 reseated on the hub base. If desired, the two rings and collar may be formed with raised dimples to assist radial alignment in darkened conditions. A guide line may also be provided as shown in FIG. 2. Now rotation of the wheel again causes the shaft 25 to rotate. Variations in the number, shape and radial locations of the various projections and recesses on the rings 40 and 18 and on the collar 28 lessens the chance existence of duplicates being held by unauthorized persons.

Figure 4:
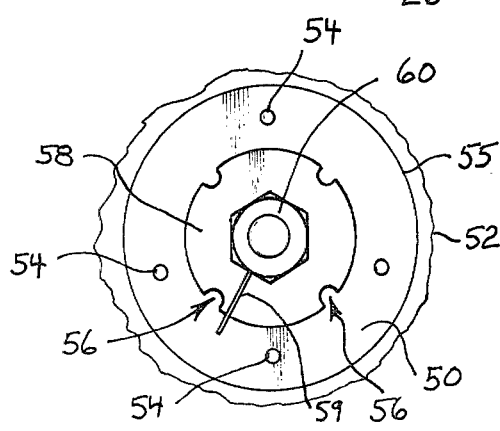
FIG. 4 is a front view of a security apparatus of the invention in an alternative form.

FIG. 4 illustrates an alternate embodiment having removable ring 50 that is seated and held in position upon a wheel hub 52 by pins 54 that project upwardly from the hub through radially spaced holes in the ring. Here there is no hub collar. Instead the annular peripheral surface 55 of the ring is regular. Only the inner, generally annular surface of the ring is formed with radially spaced projections 56 that fit in mating recesses of the shaft collar 58. A spring holddown bar 59 is provided here in lieu of a magnet which is mounted about the shaft under nut 60 for side to side manual deflection in order to release the removable ring 50. Operation of the apparatus is otherwise similar to the embodiment first described.

It should be understood that the just described embodiments merely illustrate principles of the invention in two preferred forms. Many modifications, additions and deletions may, of course, be made thereto without departure from the spirit and scope of the invention as set forth in the following claims.

What is claimed is:

1. Apparatus for securing a wheel and shaft comprising a collar adapted to be rigidly mounted to the shaft having a generally annular peripheral surface formed with a plurality of circumferentially spaced recesses; a ring having a generally annular inner surface formed with a plurality of circumferentially spaced projections keyed for removable placement within said collar recesses; means for releasibly coupling said ring with the wheel when positioned about said collar; and magentic means for releasibly holding said ring in position about said collar on the wheel.

2. Apparatus for securing a wheel and shaft comprising a collar adapted to be rigidly mounted to the shaft having a generally annular peripheral surface formed with a plurality of circumferentially spaced recesses; a ring having a generally annular inner surface formed with a plurality of circumferentially spaced projections keyed for removable placement within said collar recesses; means for releasibly coupling said ring with the wheel when positioned about said collar; and spring means adapted to be mounted to the shaft for releasibly holding said ring in position about said collar on the wheel.

* * * * *